United States Patent Office 3,219,600
Patented Nov. 23, 1965

3,219,600
METHOD OF PRODUCING CLOSED CELL SPONGE RUBBER
Howard L. Rucker, Somerville, N.J., assignor to Johns-Manville Corporation, New York, N.Y., a corporation of New York
No Drawing. Filed Dec. 18, 1963, Ser. No. 331,385
20 Claims. (Cl. 260—2.5)

This invention relates to the method of manufacturing gas expanded, closed cell sponge rubber. More particularly the invention comprises a simplified method of manufacturing gas expanded, closed cell sponge rubber which is based upon, or comprises the utilization of a novel source for the expanding or blowing gas and eliminates the use of conventional chemical blowing agents.

This application is a continuation-in-part of my copending United States patent application, Serial No. 33,371, filed June 2, 1960, now abandoned, which, in turn, is a continuation-in-part of my then copending but now abandoned United States patent application, Serial No. 716,535, filed February 21, 1958, now abandoned.

Open cell and closed cell sponge rubber, and their manufacture by means of chemical blowing agents, such as carbonates, sodium nitrite and ammonium chloride, azo isobutyric dinitrile, or the like, having long been known in the rubber art. Open cell sponge, for example, may be manufactured simply by incorporating a suitable blowing agent within a rubbery mass and heating the mass to decompose or activate the chemical blowing agent whereby it evolves or generates gas and to soften or plasticize said rubbery mass, and if appropriate, vulcanize or cure the rubbery material, while confining the gas filled rubbery mass within a suitable shaping or retaining mold or means. Thus, although the manufacture of open cell sponge is relatively free from troublesome or complicated techniques or procedures, the open cell sponge type of product is not suitable in many applications because, among other disadvantages, it absorbs liquids and gases, is not buoyant in water, is denser and requires greater compression to provide a sealing effect equivalent to that of closed cell sponge. Moreover, because of its greater surface area, open cell sponge is subject to rapid deterioration and attack by deleterious elements.

Closed cell sponge or gas expanded rubber, comprising a rubbery mass or matrix containing enclosed or occluded gas filled cells sealed within films of rubber, overcomes many of the inherent disadvantages of open cell sponge and is vastly superior in many respects; however, the manufacture of gas expanded, closed cell sponge rubber involved troublesome and expensive procedures, techniques and equipment which frequently require complex and rigid controls. One method, for example, of preparing gas expanded closed cell rubber comprises externally applying a gas, such as nitrogen, to a mass of rubber under a pressure of about 3,000 p.s.i. whereby the gas is gradually adsorbed or permeated throughout the rubber, but such pressures demand expensive and massive equipment and extended periods of time are required for complete permeation of the gas throughout the rubber. Numerous other methods or techniques have been devised or proposed to avoid the expense of the high pressure method. Frequently, however, these improved methods of techniques are based upon elaborate schemes consisting of coordinating or synchronizing the chemical and/or physical properties or reactions of a particular rubber composition and a particular chemical blowing agent thus requiring precise and rigid controls and/or timing in the compounding of the rubber, its consistency or ingredients, temperatures or other reaction conditions which induce evolution of the blowing gas, soften or plasticize the rubber and/or vulcanize or cure the same. Moreover, notwithstanding exacting controls and/or timing, such methods or techniques by their very nature have a tendency to be erratic insofar as product uniformity and consistency whereby high rejects result in a substantial waste.

Exemplary of prior means, techniques and the art in the manufacturing of closed cell, gas expanded rubber products are the disclosures of U.S. Letters Patent Nos. 1,551,110; 1,905,269; 2,086,513; 2,291,213; 2,299,593; 2,634,243; 2,666,751; 2,707,707; and 3,111,496.

It is a primary object of this invention to provide an improved and simplified method of manufacturing gas expanded, closed cell sponge rubber which does not require the use of conventional gas evolving or producing chemical blowing agents, high pressures, pre-vulcanization, stringent controls or the like.

It is also a primary object of this invention to provide a method of producing conventional closed cell, gas expanded or distended rubber products wherein the gas expanding agent is physically incorporated in the form of a gas and as such does not require or involve any chemical action whereby there is no chemical interrelationship or limitations as to the compositions and/or the chemical activity of the rubber composition or the balance of the constituents.

It is a further object of this invention to provide a simplified and economical method for manufacturing gas expanded, closed cell sponge rubber which may be carried out with a single step cure and in the same manner and with the same relatively simple and low cost apparatus typically utilized in the manufacture of open cell sponge.

A further object of this invention is an improved method or technique which provides for the manufacture of integral bodies of closed cell material such as sheets, articles or the like of substantially greater size or dimensions than heretofore possible and by means of continuous manufacture procedures.

A still further object of the invention is to provide a one-step method of manufacturing gas expanded, closed cell sponge of uniform consistency, in substantially any size or configuration, which is dimensionally stable and with skin or integument of major surfaces.

This invention will be more fully understood and further objects and advantages thereof will become apparent from a hereinafter detailed description.

According to the present invention, the foregoing as well as other advantages are achieved by providing or supplying the gaseous medium necessary for the formation and expansion of closed cells in the manufacture of gas expanded, closed cell sponge, in the form of a gas physically contained within balloons or spheres of relatively small size rather than as a material or substance which requires a chemical decomposition or reaction to evolve or produce the required gas. Thus, the manufacture of gas expanded, closed cell sponge rubber, according to this invention, comprises mixing or blending gas filled or containing balloons or spheres with a suitable rubber-like composition such as by grinding or masticating the solid rubber on a rubber mill or other conventional rubber mixing equipment to break down and plasticize the rubber and to uniformly disperse said balloons or spheres throughout the mass of the rubber-like composition, then heating said mixture to further plasticize or soften the said rubber-like composition and to expand the gas contents of the balloons or spheres embodied within the mass or matrix of the rubber-like material and in turn expand the said rubber-like mass or matrix, preferably while the balloon containing rubber-like mass or matrix is confined during expansion within a suitable retaining means of the particular shape or configuration ultimately desired, and thermally vulcanize or cure the resulting gas expanded mass or matrix.

The gas filled or containing balloons or spheres, for instance, may be blended with an unvulcanized or uncured, or an incompletely vulcanized or cured rubber-like material, either with or without common vulcanizing or curing agents, prior to, during or upon completion of compounding, and any typical rubber blending or compounding means, such as a conventional rubber mill, Banbury mixer or the like, will satisfactorily disperse and blend the gas filled balloons or spheres throughout a rubbery material. Upon sufficient compounding of the rubbery material and/or blending of the balloons or spheres throughout the same, the blended mass is preferably subjected to an approximate or rough pre-shaping. For example, where a sheet or slab or closed cell sponge or gas expanded rubber is desired the mass comprising a blend of gas filled balloons and rubber-like material may be calendered out or otherwise shaped to a sheet or slab prior to heat expanding the gas contained within the balloons and curing the rubber-like material. The roughly shaped mass or mixture of balloons and rubber-like material is preferably placed within a simple confining means designed or shaped to impart the ultimate or expanded general configuration desired by opposing uninhibited expansion in any or all directions, and heat applied thereto to soften or plasticize the rubbery mass, to expand the gas contained within the balloons or spheres, and in turn to expand the plasticized rubbery mass and vulcanize or heat cure the rubber. The thermal expansion of the matrix or body of the rubber-like material must be continued to the point whereby its mass is increased at least approximately 100 up to 400 or 500% by volume, preferably an increase of about 300% by volume, to produce a typical closed cell, gas expanded sponge product. Of course there is some shrinkage of the thus prepared articles upon cooling of the heat expanded gas as is typical in the manufacture of all gas expanded, closed cell products; however, this shrinkage, as in previous manufacturing procedures, is compensated for by simply preparing or producing an over-sized, incompleted product which shrinks to the size ultimately desired.

One convenient and typical means of carrying out the latter step, in the case of manufacturing sponge in sheet or slab form, may comprise confining the unexpanded and uncured blended mass between press platens which are provided with heating means and increasing the temperature of the mass of the matrix of rubbery material and gas containing balloons or spheres to plasticize or soften the mass and to adequately expand the entrapped gases until the desired pore or cell size has been reached and the mass has expanded to the point of substantially completely and uniformly filling the space between the platens to result in a substantially uniform sheet or slab and, if desired, vulcanize or heat cure the rubbery material. Of course, the relative position of the two press platens may be such that the extent of expansion, or density of the resultant product may be regulated. The thermal expansion of the rubbery material, whether or not mechanically confined, generally should not continue to the point of bursting or rupturing a majority of the enclosing or occluding rubber cell walls because such excessive expansion will result in a non-uniform or irregular, more or less open cell-type product. Thus, it is apparent that the same low pressure and economical techniques and apparatus typically utilized in the manufacture of open cell sponge may advantageously be employed in the manufacture of gas expanded, closed cell sponge rubber by means of the foregoing procedure. Moreover, any suitable mold or confining means which will impart an approximate desired shape or configuration as well as conventional molding methods or techniques may be utilized during heat expansion and/or curing if a particular configuration is desired or appropriate.

Gas filled or containing balloons or spheres suitable for the practice of this invention comprise those disclosed in United States Letters Patent No. 2,101,635 and No. 2,797,201 and commercial products such, for example, as Colfoam Microballoons, urea-formaldehyde, nitrogen filled spheres manufactured by the Colton Chemical Company, Division of Air Reduction Company, Inc., Cleveland 14, Ohio, a subsidiary of Union Carbide and Carbon Corp., or Microballoons, nitrogen filled phenol formaldehyde spheres manufactured by Bakelite Corporation, Madison Avenue, New York, New York, also a subsidiary of Union Carbide and Carbon Corp. Air Reduction's Colfoam Microballoons are generally sized within the approximate range of 2 to 60 microns in diameter and it is desirable that the balloons or spheres fall within the size classification of approximately 1 to 500 microns in diameter, preferably about 1 to 100 microns in diameter, to provide maximum dispersion of fine discrete cells throughout the resultant closed cell sponge product. The diameter of the balloons, of course, can be utilized as a means of influencing or determining the size of the ultimate cells in the sponge, and, therefore, the size of the gas filled balloons is not understood to be critical and the material, i.e., the sphere size, should be selected to suit the product, e.g., cell size, desired. Typically a maximum of very fine discrete cells are desired which calls for relatively small, e.g., 1 to 100 microns, gas filled balloons. The balloons or spheres may contain substantially any gas provided, of course, that the gas is one which will not attack or adversely react with the other components of the composition. Moreover, gases not present in the atmosphere or present in only small proportions and which are somewhat soluble in rubber tend to diffuse through the cured gas expanded product and thus may result in extensive shrinkage or collapse of the product. In view of the foregoing it becomes apparent that although gases other than nitrogen may undoubtedly be used in the manufacture of closed cell or gas expanded sponge, nitrogen gas is unquestionably best suited for this particular application.

The method of this invention is applicable to and comprises the preparation of gas expanded, closed cell sponge from any of the common and known natural and/or synthetic, vulcanizable rubbery polydienes or polymers of diolefinic compounds such as polyisoprene, polybutadiene, diene-vinyl compound copolymers, etc., and comprising rubbery polymers containing the isoprene or butadiene-1,3 nucleus including natural rubber, rubbery copolymers of butadiene and styrene (Buna S or GR–S), rubbery copolymers of butadiene and acrylonitrile (Buna N), rubbery polymers of 2-cholro-1,3-butadiene, and rubbery copolymers of isobutene and isoprene (butyl rubber or vulcanizable butene polymers). These rubber-like materials or elastomers, various formulations thereof, vulcanizing agents, fillers, etc., their compounding and vulcanizing, are all familiar to the rubbery industry or available in the literature and from their respective manufacturers or suppliers and the rubber or rubber and the compounding and vulcanizing thereof can be selected or prepared and cured as in prior means of producing such products with conventional chemical blowing agents. The terms "a rubber," "rubber-like," "rubbery material" or the like as used in and throughout this specification and the appended claims are to be construed to include compounded and uncompounded natural and synthetic elastomers or polymers of diolefinic or diene compounds with rubber-like characteristics or properties.

The gas filled balloons or spheres may be incorporated in, or blended with rubber-like material in proportions ranging from approximately 2 to 100% by weight, based upon the elastomer or elastomers, or rubbery polymer or polymers of the compounded rubber-like material. The amount of gas filled balloons, or their ratio to the rubbery elastomer, polymer or the like, or to the total mass, depends, of course, upon the consistency, size and number of cells or pores desired in the finished product, but the rubbery elastomer, polymer or the like must be present in sufficient amount to surround or encompass, enclose and retain a preponderance of the gas bubbles or cells and to resist rupture if uniform, small cells or pores, or a homogeneous product is required. The heat induced expansion of the gas within the balloons follows the natural gas laws and it appears that the gas filled balloons generally burst, or at least a substantial portion or majority thereof burst upon exposure to typical thermal vulcanization temperature conditions whereby the gas is released into direct contact with the pliable or heat softened rubber-like material. However, the bursting of the gas containing balloons or spheres is not a necessary condition or criterion in producing a typical closed cell, gas expanded sponge rubber in that the composition, e.g., thermosetting or thermoplastic, of the balloons or spheres among many other factors would influence their bursting but it is essential that the gas contents of the balloons or spheres expands sufficiently to swell or distend the occluding rubbery mass or matrix at least about 100% in volume or twice its initial size.

Typical vulcanizing temperatures for many common rubbers of approximately 250 to 350° F. normally provide adequate expansion of the gas within the spheres and in turn swell or distend the over-all product, for example, at least approximately 100 up to about 500% by volume, to result in a typical gas expanded, closed cell rubber but somewhat lesser or greater temperatures may be utilized depending upon the consistency of the rubber-like material and/or provided that the composition, i.e., the size and number of cells or pores produced, desired and the expansion is such that the particular rubber-like material and its occluding cell walls do not rupture. Temperatures of about 250 to 350° F., moreover, are generally sufficient to adequately plasticize or soften and induce thermal vulcanization or curing in many rubber compounds whereby expansion or formation of the cells and vulcanization or curing may be effected more or less simultaneously in one operation. However, typical or conventional heat vulcanizing or curing temperatures, for example, about 290 to 335° F. are preferred.

The following examples illustrate typical gas expanded, closed cell sponge rubber compositions prepared in accordance with the method of this invention. It is to be understood that the rubber components or the specified ingredients are exemplary and are not to be construed to limit the method to any particular elastomer or other component thereof specified in the hereinafter examples other than the gas filled spheres or balloons.

Gas expanded, closed cell sponge rubber composed of the ingredients in the proportions indicated hereinafter were prepared as follows from the given approximate formulas:

*Example I*

| | Percent by weight |
|---|---|
| GR–S (polymerized butadiene and styrene) | 33.0 |
| Polymerized trimethyldihydroquinoline antioxidant | 0.5 |
| Thermatomic carbon | 6.1 |
| Clay | 8.0 |
| Mineral oil | 16.0 |
| Petroleum jelly | 1.0 |
| Nitrogen filled phenol formaldehyde spheres (Microballoons) | 33.0 |
| Zinc oxide | 1.5 |
| Sulfur | 0.7 |
| Benzothiazyl disulfide accelerator | 0.2 |
| | 100.0 |

*Example II*

| | Percent by weight |
|---|---|
| Neoprene (polymerized 2-chloro-butadiene-1,3) | 37.5 |
| Polymerized trimethyldihydroquinoline antioxidant | 1.1 |
| Stearic acid | 0.4 |
| Magnesium oxide | 1.5 |
| Thermatomic carbon | 18.7 |
| Diatomaceous silica | 11.2 |
| Mineral oil | 22.5 |
| Petroleum jelly | 1.1 |
| Salicylic acid with a dispersing agent (Retarder W) | 1.5 |
| Nitrogen filled urea-formaldehyde spheres (Colfoam Microballoons) | 3.0 |
| Zinc oxide | 1.1 |
| 2-mercaptoimidazoline accelerator | 0.4 |
| | 100.0 |

*Example III*

| | Percent by weight |
|---|---|
| Buna N (Hycar 1001, polymerized butadiene and acrylonitrile) | 43.0 |
| Zinc oxide | 2.0 |
| Nitrogen filled phenol formaldehyde spheres (Microballoons) | 21.0 |
| Diatomaceous earth | 15.0 |
| Urea | 2.5 |
| Stearic acid | 4.5 |
| Dibutyl phthalate | 9.0 |
| Polymerized trimethyldihydroquinoline antioxidant | 1.0 |
| Sulfur | 1.0 |
| Benzothiazyl disulfide accelerator | 1.0 |
| | 100.0 |

In each case of rubber was broken down on a cold rubber mill until it was soft and plastic, a milling period of approximately 10 minutes, and the balance of the foregoing ingredients were added individually to the rubber while being milled in their order of listing followed by thorough mixing. Upon completion of the compounding the resultant sheet was cut or "slabbed" off the mill roll and permitted to rest over night, then reworked on a cold mill and calendered out into a slab or sheet approximately 0.20 inch in thickness. The slab or calendered sheet was placed in a press between heated platens positioned approximately 0.50 inch apart and heated to a temperature of approximately 327° F. (85 lbs. steam pressure) for a period of approximately 15 minutes. During this period the slab expanded approximately 150% in thickness and an insignificant amount in its other dimensions. The resultant GR–S, neoprene, and Buna N gas expanded, closed cell sponge were homogeneous or uniform in consistency or dispersion of gas cells, soft and resilient, dimensionally stable and had smooth, unbroken skin on both of their major surfaces.

It is to be understood and appreciated that in the practice of this invention that inasmuch as the blowing gas is incorporated in or applied to the rubber material in the form of a gas, no chemical or other action is required to actuate or effect its performance as a blowing gas other than simply the application of heat to induce, through physical means, an expansion of the gas and in turn an expansion or swelling of the occluding body or mass of rubber to the desired degree. Thus the composition or compounding of the rubber or rubbers and/or the vulcanizing or other chemical or physical action thereof is not effected chemically or in any other manner, other than the physical expansion, by the incorporation or utilization of the blowing gas contained within the spheres or balloons and the compositions and/or compounding of the rubber or rubbers and/or the vulcanizing or other activity thereof would not be unlike prior art means or procedures in the manufacture of like products employing conventional chemical blowing agents.

It will be understood that the details given are for the purpose of illustration, not restriction, and that variations within the scope of this invention are intended to be included within the scope of the appended claims.

I claim:

1. The method of producing closed cell, gas expanded vulcanized rubber products consisting of providing closed cells within a body of rubber and expanding the mass of the body of rubber at least about 100% in volume, said method comprising the steps of combining a vulcanizable rubbery polymer of diolefinic compounds with a vulcanizing agent and approximately 2 to 100% by weight of gas filled balloons based upon the weight of the rubber, then plasticizing the rubber and expanding its mass to at least about 100% in volume and vulcanizing the expanded mass of rubber through the application of heat, said expansion being effected through the medium of the thermally induced physical expansion of the contents of the balloons.

2. The method of producing closed cell, gas expanded vulcanized rubber products consisting of providing closed cells within a body of rubber and expanding the mass of the body of rubber at least about 100% in volume, said method comprising the steps of combining at least one vulcanizable polymer of diolefinic compounds selected from the group consisting of natural rubber, rubbery copolymers of butadiene and styrene, rubbery copolymers of butadiene-acrylonitrile, rubbery polymers of 2-chloro-1,3-butadiene, and rubbery copolymers of isobutene and isoprene with a vulcanizing agent and approximately 2 to 100% by weight of gas filled balloons based upon the weight of the rubber, then plasticizing the rubber and expanding its mass to at least about 100% in volume and vulcanizing the expanded mass of rubber through the application of heat, said expansion being effected through the medium of the thermally induced physical expansion of the gas contents of the balloons.

3. The method of producing closed cell, gas expanded vulcanized rubber products consisting of providing closed cells within a body of rubber and expanding the mass of the body of rubber at least about 100% in volume, said method comprising the steps of milling a solid mass of a vulcanizable rubbery polymer of diolefinic compounds to plasticize it and combine therewith a vulcanizing agent and approximately 2 to 100% by weight of gas filled balloons based upon the weight of the rubber, then further plasticizing the rubber and expanding its mass to at least about 100% in volume and vulcanizing the expanded mass of rubber through the application of heat, said expansion being effected through the medium of the thermally induced physical expansion of the gas contents of the balloons.

4. The method of producing closed cell, gas expanded vulcanized rubber products consisting of producing closed cells within a body of rubber and expanding the mass of the body of rubber at least about 100% in volume, said method comprising the steps of combining a vulcanizable rubbery polymer of diolefinic compounds with a vulcanizing agent and approximately 2 to 100% by weight of gas filled balloons based upon the weight of the rubber, then plasticizing the rubber and expanding its mass to at least about 100% in volume and vulcanizing the expanded mass of rubber by heating said combined rubber mass to at least about 250° F., said expansion being effected through the medium of the thermally induced physical expansion of the gas contents of the balloons.

5. The method of producing closed cell, gas expanded vulcanized rubber products consisting of producing closed cells within a body of rubber and expanding the mass of the body of rubber at least about 100% in volume, said method comprising the steps of combining a vulcanizable rubbery polymer of diolefinic compounds with a vulcanizing agent and approximately 2 to 100% by weight of gas filled balloons based upon the weight of the rubber, then plasticizing the rubber and expanding its mass to at least about 100% in volume and vulcanizing the expanded mass of rubber by heating said combined rubber mass to at least about 290° F., said expansion being effected through the medium of the thermally induced physical expansion of the gas contents of the balloons.

6. The method of producing closed cell, gas expanded vulcanized rubber products consisting of providing closed cells within a body of rubber and expanding the mass of the body of rubber at least about 100% in volume, said method comprising the steps of combining at least one vulcanizable rubbery polymer of diolefinic compounds selected from the group consisting of natural rubber, rubbery copolymers of butadiene and styrene, rubbery copolymers of butadiene-acrylonitrile, rubbery polymers of 2-chloro-1,3-butadiene, and rubbery copolymers of isobutene and isoprene with a vulcanizing agent and approximately 2 to 100% by weight of gas filled balloons based upon the weight of the rubber, then plasticizing the rubber and expanding its mass to at least about 100% in volume and vulcanizing the expanded mass of rubber by heating said combined rubber mass to a temperature of at least about 250° F., said expansion being effected through the medium of the thermally induced physical expansion of the gas contents of the balloons.

7. The method of producing closed cell, gas expanded vulcanized rubber products consisting of providing closed cells within a body of rubber and expanding the mass of the body of rubber at least about 100% in volume, said method comprising the steps of combining at least one vulcanizable rubbery polymer of diolefinic compounds selected from the group consisting of natural rubber, rubbery copolymers of butadiene and styrene, rubbery copolymers of butadiene and acrylonitrile, rubbery polymers of 2-chloro-1,3-butadiene, and rubbery copolymers of isobutene and isoprene with a vulcanizing agent and approximately 2 to 100% by weight of gas filled balloons based upon the weight of the rubber, then plasticizing the rubber and expanding its mass to at least about 100% in volume and vulcanizing the expanded mass of rubber by heating said combined rubber mass to a temperature of at least about 290° F., said expansion being effected through the medium of the thermally induced physical expansion of the gas contents of the balloons.

8. The method of producing closed cell, gas expanded vulcanized rubber products consisting of providing closed cells within a body of rubber and expanding the mass of the body of rubber at least about 100% in volume, said method comprising the steps of milling a solid mass of a vulcanizable rubbery polymer of diolefinic compounds to plasticize it and combine therewith a vulcanizing agent and approximately 2 to 100% by weight of gas filled balloon based upon the weight of the rubber, then further plasticizing the rubber and expanding its mass to at least about 100% in volume and vulcanizing the expanded mass of rubber by heating said combined mass of rubber to a temperature of at least about 250° F., said expansion being effected through the medium of the thermally induced physical expansion of the gas contents of the balloons.

9. The method of producing closed cell, gas expanded vulcanized rubber products consisting of providing closed cells within a body of rubber and expanding the mass of the body of rubber at least about 100% in volume, said method comprising the steps of milling a solid mass of a vulcanizable rubbery polymer of diolefinic compounds to plasticize it and combine therewith a vulcanizable agent and approximately 2 to 100% by weight of gas filled balloons based upon the weight of the rubber, then further plasticizing the rubber and expanding its mass to at least about 100% in volume and vulcanizing the expanded mass of rubber by heating said combined mass of rubber to a temperature of at least about 290° F., said expansion being effected through the medium of the thermally induced physical expansion of the gas contents of the balloons.

10. The method of producing closed cell, gas expanded vulcanized rubber products consisting of providing closed cells within a body of rubber and expanding the mass of the body of rubber at least about 100% in volume, said method comprising the steps of milling a solid mass of a vulcanizable rubbery polymer of diolefinic compounds to plasticize it and combine therewith a vulcanizable agent and approximately 2 to 100% by weight, based upon the weight of the rubber, of gas filled balloons sized from approximately 1 to 500 microns in diameter, then further plasticizing the rubber and expanding its mass to at least about 100% in volume and vulcanizing the expanded mass of rubber by heating said combined mass of rubber to a temperature of at least about 250° F., said expansion being effected through the medium of the thermally induced physical expansion of the gas contents of the balloons.

11. The method of producing closed cell, gas expanded vulcanized rubber products consisting of providing closed cells within a body of rubber and expanding the mass of the body of rubber at least about 100% in volume, said method comprising the steps of combining at least one vulcanizable polymer of diolefinic compounds selected from the group consisting of natural rubber, rubbery copolymers of butadiene and styrene, rubbery copolymers of butadiene and acrylonitrile, rubbery polymers of 2-chloro-1,3-butadiene, and rubbery copolymers of isobutene and isoprene with a vulcanizing agent and approximately 2 to 100% by weight of gas filled balloons based upon the weight of the rubber, then plasticizing the rubber and expanding its mass to at least about 100% in volume and vulcanizing the expanded mass of rubber by heating said combined mass of rubber to a temperature of approximately 250 to 350° F., said expansion being effected through the medium of the thermally induced physical expansion of the gas contents of the balloons.

12. The method of producing closed cell, gas expanded vulcanized rubber products consisting of providing closed cells within a body of rubber and expanding the mass of the body of rubber at least about 100% in volume, said method comprising the steps of combining at least one vulcanizable polymer of diolefinic compounds selected from the group consisting of natural rubber, rubbery copolymers of butadiene and styrene, rubbery copolymers of butadiene and acrylonitrile, rubbery polymers of 2-chloro-1,3-butadiene, and rubbery copolymers of isobutene and isoprene with a vulcanizing agent and approximately 2 to 100% by weight of gas filled balloons based upon the weight of the rubber, then plasticizing the rubber and expanding its mass to at least about 100% in volume and vulcanizing the expanded mass of rubber by heating said combined mass of rubber to a temperature of approximately 290 to 335° F., said expansion being effected through the medium of the thermally induced physical expansion of the gas contents of the balloons.

13. The method of producing closed cell, gas expanded vulcanized rubber products consisting of providing closed cells within a body of rubber and expanding the mass of the body of rubber at least about 100% in volume, said method comprising the steps of milling a solid mass of at least one vulcanizable rubbery polymer of diolefinic compounds selected from the group consisting of natural rubber, rubbery copolymers of butadiene and styrene, rubbery copolymers of butadiene and acrylonitrile, rubbery polymers of 2-choloro-1,3-butadiene, and rubbery copolymers of isobutene and isoprene to plasticize it and combining therewith a vulcanizing agent and approximately 2 to 100% by weight of gas filled balloons based upon the weight of the rubber, then further plasticizing the rubber and expanding its mass to at least about 100% in volume and vulcanizing the expanded mass of rubber by heating said combined mass of rubber to a temperature of approximately 250 to 350° F., said expansion being effected through the medium of the thermally induced physical expansion of the gas contents of the balloons.

14. The method of producing closed cell, gas expanded vulcanized rubber products consisting of providing closed cells within a body of rubber and expanding the mass of the body of rubber at least about 100% in volume, said method comprising the steps of milling a solid mass of at least one vulcanizable rubbery polymer of diolefinic compounds selected from the group consisting of natural rubber, rubbery copolymers of butadiene and styrene, rubbery copolymers of butadiene and acrylonitrile, rubbery polymers of 2-chloro-1,3-butadiene, and rubbery copolymers of isobutene and isoprene to plasticize it and combining therewith a vulcanizing agent and approximately 2 to 100% by weight of gas filled balloons based upon the weight of the rubber, then further plasticizing the rubber and expanding its mass to at least about 100% in volume and vulcanizing the expanded mass of rubber by heating said combined mass of rubber to a temperature of approximately 290 to 335° F., said expansion being effected through the medium of the thermally induced physical expansion of the gas contents of the balloons.

15. The method of producing closed cell, gas expanded vulcanized rubber products consisting of providing closed cells within a body of rubber and expanding the mass of the body of rubber at least about 100% in volume, said method comprising the steps of milling a solid mass of at least one vulcanizable polymer of diolefinic compounds selected from the group consisting of natural rubber, rubbery copolymers of butadiene and styrene, rubbery copolymers of butadiene and acrylonitrile, rubbery polymers of 2-chloro-1,3-butadiene, and rubbery copolymers of isobutene and isoprene to plasticize it and combining therewith a vulcanizing agent and approximately 2 to 100% by weight, based upon the weight of the rubber, of gas filled balloons sized from approximately 1 to 500 microns in diameter, then further plasticizing the rubber and expanding its mass to at least about 100% in volume and vulcanizing the expanded mass of rubber by heating the said combined mass of rubber to a temperature of approximately 250 to 350° F., said expansion being effected through the medium of the thermally induced physical expansion of the gas contents of the balloons.

16. The method of producing closed cell, gas expanded vulcanized rubber products consisting of providing closed cells within a body of rubber and expanding the mass of the body of rubber at least about 100% in volume, said method comprising the steps of milling a solid mass of at least one vulcanizable polymer of diolefinic compounds selected from the group consisting of natural rubber, rubbery copolymers of butadiene and styrene, rubbery copolymers of butadiene and acrylonitrile, rubbery polymers of 2-chloro-1,3-butadiene, and rubbery copolymers of isobutene and isoprene to plasticize it and combining therewith a vulcanizing agent and approximately 2 to 100% by weight, based upon the weight of the rubber, of gas filled balloons sized from approximately 1 to 500 microns in diameter, then further plasticizing the rubber and expanding its mass to at least about 100% in volume and vulcanizing the expanded mass of rubber by heating the said combined mass of rubber to a temperature of approximately 290 to 335° F., said expansion being effected through the medium of the thermally induced physical expansion of the gas contents of the balloons.

17. The method of producing closed cell, gas expanded vulcanized rubber products consisting of providing closed cells within a body of rubber and expanding the mass of the body of rubber at least about 100% in volume, said method comprising the steps of milling a solid mass of at least one vulcanizable polymer of diolefinic compounds selected from the group consisting of natural rubber, rubbery copolymers of butadiene and styrene, rubbery copolymers of butadiene and acrylonitrile, rubbery polymers of 2-chloro-1,3-butadiene, and rubbery copolymers of isobutene and isoprene to plasticize it and combining therewith a vulcanizing agent and approximately 2 to 100% by weight, based upon the weight of the rubber, of gas filled balloons sized from approximately 1 to 100 microns in diameter, then further plasticizing the rubber and expanding its mass to at least about 100% in volume and vulcanizing the expanded mass of rubber by heating the said combined mass of rubber to a temperature of approximately 250 to 350° F., said expansion being effected through the medium of the thermally induced physical expansion of the gas contents of the balloons.

18. The method of producing closed cell, gas expanded vulcanized rubber products consisting of providing closed cells within a body of rubber and expanding the mass of the body of rubber at least about 100% in volume, said method comprising the steps of milling a solid mass of at least one vulcanizable polymer of diolefinic compounds selected from the group consisting of natural rubber, rubbery copolymers of butadiene and styrene, rubbery copolymers of butadiene and acrylonitrile, rubbery polymers of 2-chloro-1,3-butadiene, and rubbery copolymers of isobutene and isoprene to plasticize it and combining therewith a vulcanizing agent and approximately 2 to 100% by weight, based upon the weight of the rubber, of gas filled balloons sized from approximately 1 to 100 microns in diameter, then further plasticizing the rubber and expanding its mass to at least about 100% in volume and vulcanizing the expanded mass of rubber by heating the said combined mass of rubber to a temperature of approximately 290 to 335° F., said expansion being effected through the medium of the thermally induced physical expansion of the gas contents of the balloons.

19. The closed cell, gas expanded vulcanized rubber products of the method of claim 1.

20. The closed cell, gas expanded vulcanized rubber products of the method of claim 11.

References Cited by the Examiner

UNITED STATES PATENTS 2,945,776  7/1960  Conguisti et al. _____ 260—2.5
3,062,682  11/1962  Morgan et al. _____ 260—2.5

MURRAY TILLMAN, *Primary Examiner.*